Sept. 9, 1952 W. E. SHOTTON 2,609,850
MANUFACTURE OF INDUSTRIAL WOOL FROM SOLID STOCK
Filed April 26, 1949 4 Sheets-Sheet 1
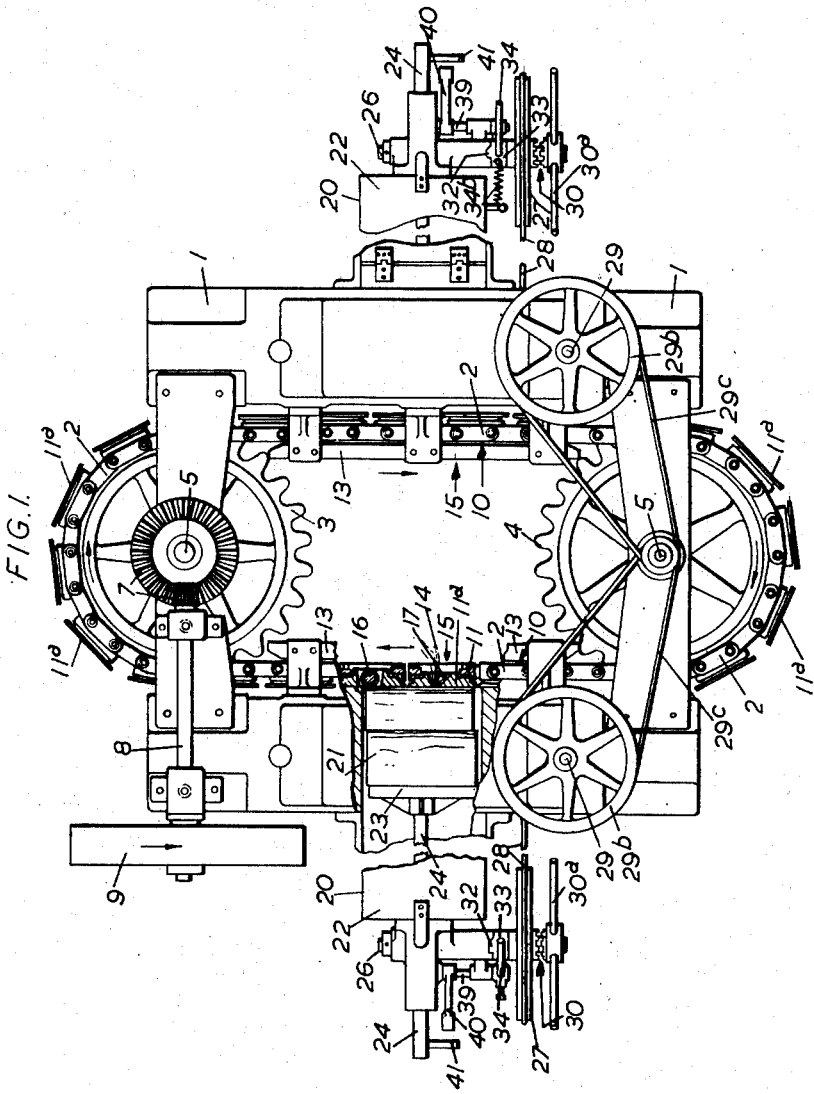
Inventor
WALTER EDWARD SHOTTON
By
Richardson, David and Nordon
Attorneys

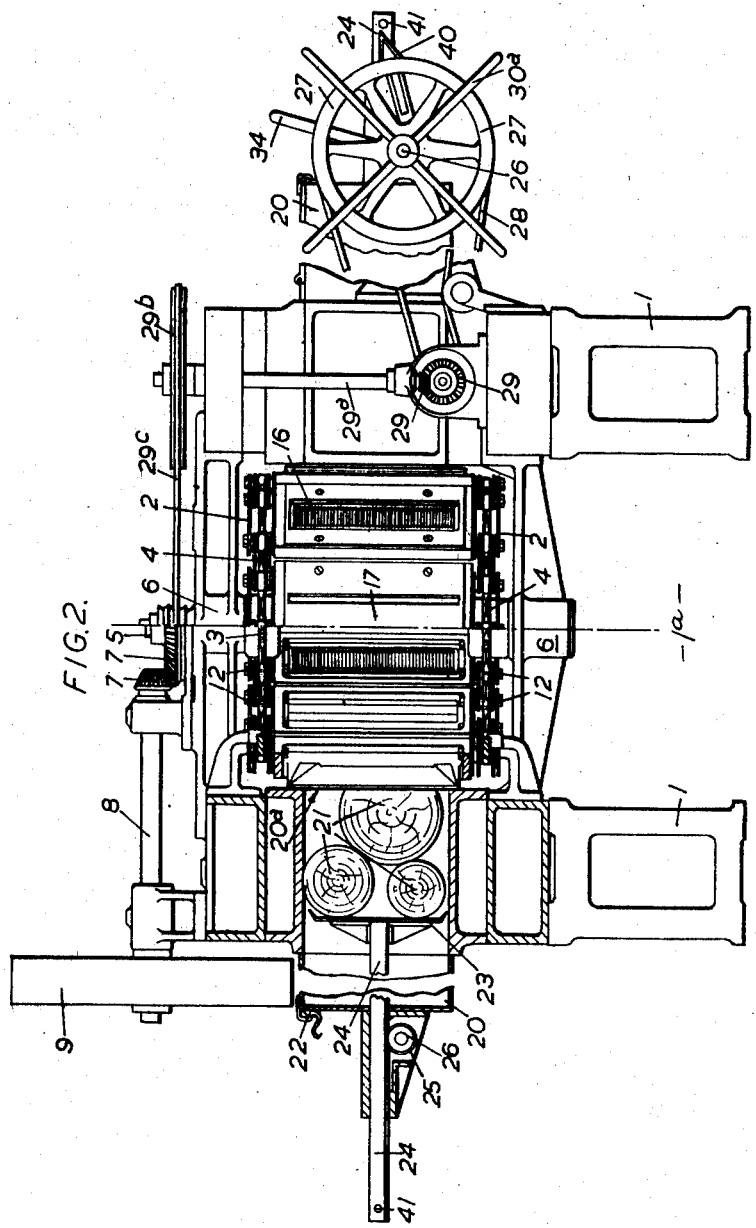

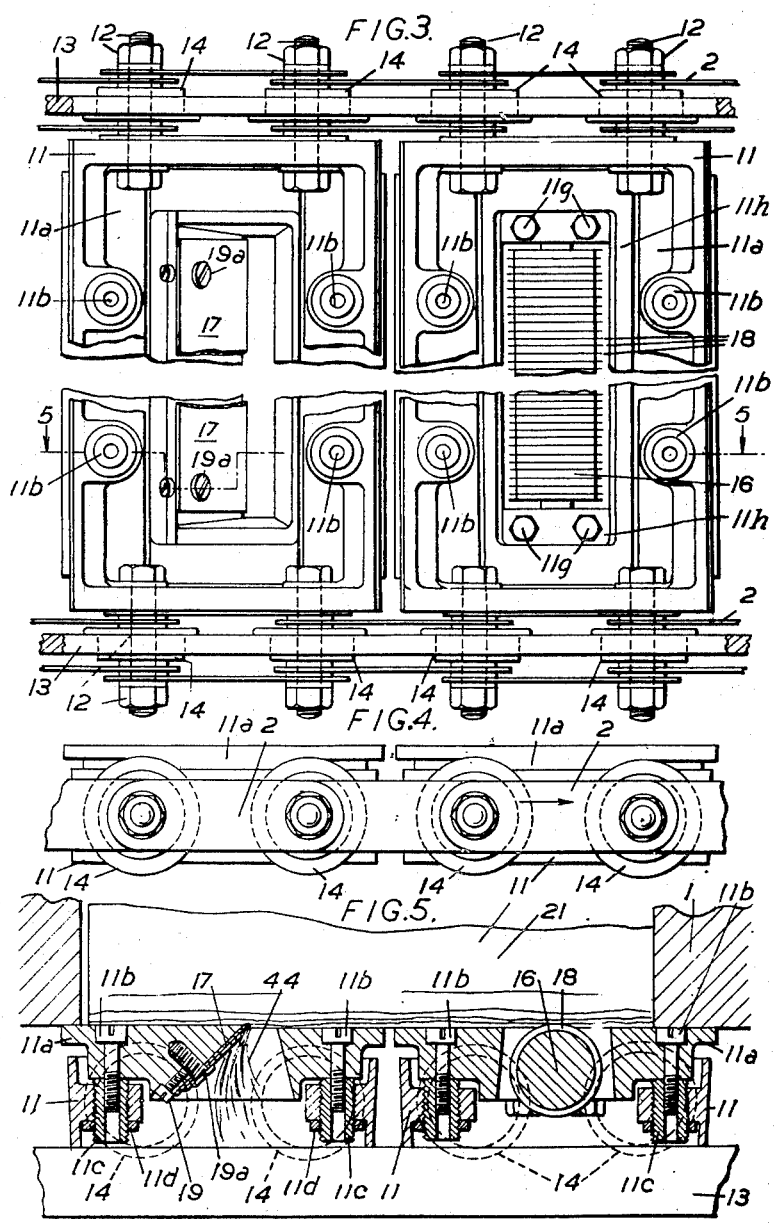

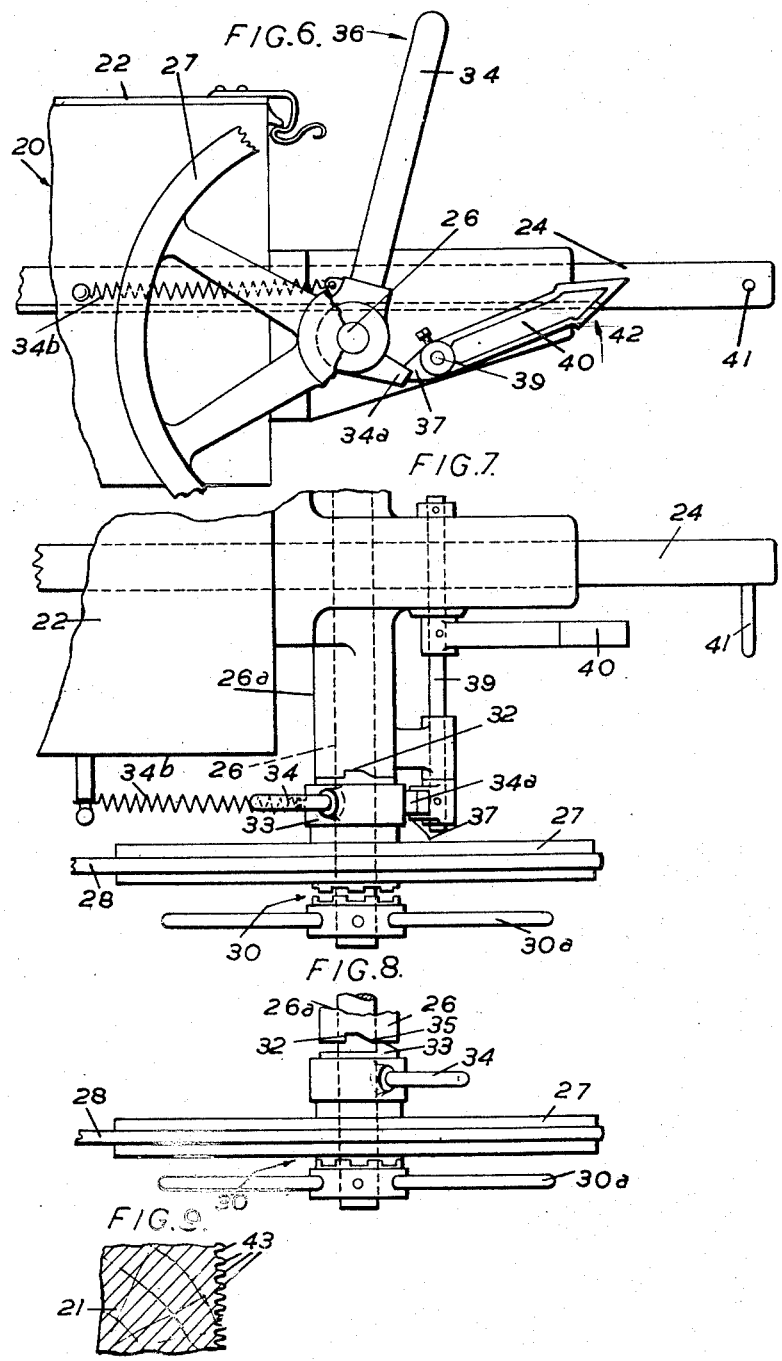

Patented Sept. 9, 1952

2,609,850

UNITED STATES PATENT OFFICE 2,609,850

MANUFACTURE OF INDUSTRIAL WOOL FROM SOLID STOCK

Walter Edward Shotton, Smethwick, Birmingham, England

Application April 26, 1949, Serial No. 89,621
In Great Britain January 31, 1948

1 Claim. (Cl. 144—187)

This invention has reference to a machine for the manufacture of industrial wool, such as wood wool, metal wool and synthetic resinous wool, comprised of a multiplicity of strands shaved from solid stock and is more particularly concerned with the manufacture of wood wool produced by shaving timber, for use generally as a protective packing or filling for articles to be transported either singly or in bulk in packing cases or crates, although such wood wool may be used for a variety of purposes.

A machine for making wood wool and comprising a stock holder and a reciprocating cutter or knife is adapted to cut thin strips from timber stock is known, but it suffers from the disadvantage that production is very slow.

An object of the invention is to provide an improved machine for making such wool (hereinafter referred to as "wood wool"), which will ensure a greatly increased production over a given time period without requiring a large floor space for manufacturing purposes.

With this object in view, the invention consists of certain novel features of construction arrangement and combination of parts hereinafter fully described and particularly pointed out in the appended claim.

In the accompanying drawings one embodiment of the invention is illustrated by way of example. In the drawings—

Fig. 1 is a plan of the general arrangements of a rotary machine designed for making wood wool, the opposite stock holders on the right and left of the machine being broken away for the convenience of illustration.

Fig. 2 is an elevation of Fig. 1.

Fig. 3 is an elevation, drawn to a larger scale, of a part of the transmission chains and showing a pair of tool holders of which one carries a multiple splitter or groover and the other a knife.

Fig. 4 is a plan of Fig. 3.

Fig. 5 is a section of Fig. 3 taken on the dotted line 5—5.

Fig. 6 is a side elevational detail showing the stock box and the trip feed mechanism.

Fig. 7 is a plan of Fig. 6.

Fig. 8 is a fragment of Fig. 7.

Fig. 9 is a sectional detail of a piece of wood after splitting.

In the drawings, and with particular reference to Figs. 1 and 2, a machine frame 1 has an endless chain driving mechanism consisting of a pair of superposed chains 2 traversing a horizontal path by engaging two pairs of sprockets 3, 4, of uniform diameter whose vertical shafts 5 are supported in bearings 6. The upper driving sprocket of the pair 3 is driven by bevel gearing 7 through a driving shaft 8 whose fast pulley 9 is driven through a belt by an electric motor (not shown). The chains 2 provide two parallel straight stretches 10 between the sprockets 3, 4. These superposed chains 2, which are of the conventional link and roller type, are interconnected by several tool holders 11 perpendicular to the path of the chains 2, these tool holders 11 being provided at their upper and lower ends with nut and bolt connections 12 by which the tool holders are securely connected to the chains 2, with sufficient clearance to enable the chain links and their tool holders to move angularly round the sprockets 3, 4. Each tool holder consists of two parts, the frame 11 connected to the chains 2 and an easily removable tool carrier 11a which is detachably connected to the frame 11 by bolts 11b engaging axially adjustable screw threaded bushes 11c on the frame 11, which bushes are adapted to be locked in position by nuts 11d, the bushes 11c enabling the tool carriers 11a to be accurately adjusted relatively to stock 21 in stock holders 20. Pairs of horizontal abutments bars 13, mounted on the frame 1 near to the straight stretches 10, are arranged to co-act with flanged rollers 14 of the chains in order to avoid sagging of the chains 2 at these stretches 10 and thus to exert pressure thereat in outward directions as indicated by the arrows 15 (Fig. 1). Each tool holder 11 carries a detachable cutter or knife, these cutters 16, 17, being arranged in pairs and consisting of a splitting cutter 16 and a shaving cutter 17 in the rear of the splitting cutter 16. The splitting cutters 16 each consist of a peripherally grooved cylinder providing multiple cutting edges 18; the cutting edges 18 can be formed like a screw. It is possible to rotate each splitting cutter 16 on its axis and clamp it in adjusted position so that fresh cutting edges can be readily obtained when desired. This is accomplished by releasing the bolts 11g which secure the clamps 11h to the tool carrier 11a, these clamps 11h co-acting with a shank at each end of the splitting cutter 16. The shaving cutters 17, which are of the ordinary blade type, can be adjusted by the screws 19 and clamped in position by the bolts 19a.

At right angles to the paths 10 of the chains 2 and arranged at each side of the machine is a stationary stock holder or box 20 for reception of wood blocks 21, said holders each having a hinged lid 22 and being a depth which approximates to the vertical dimension of each cutter 16, 17. The stock holders 20 are similarly constructed so that an explanation of one will suffice.

A stock holder 20, which is open at its inner end 20a, is provided with a pressure feed member consisting of a vertical plate 23 rigid with a horizontally disposed rack 24. Slow motion can be continuously transmitted to the rack 24 by a pinion 25 whose drive shaft 26 is driven by a pulley 27 through a dog clutch 30. The pulley 27 has a belt drive 28 via bevel gearing 29 through a vertical shaft 29a whose driving pulley 29b is powered by a direct belt drive 29c from one of the shafts 5. The pulley 27 is loosely and slidably mounted on the pinion shaft 26 and its hub carries the driving element of the clutch 30 whereas the driven element is fast on the hub of a capstan 30a fast with the shaft 26. This clutch 30 is controlled by a tripping mechanism embodying a dog on the shaft housing 26a and which comprises a stationary collar 32 and a loose collar 33 having a spring-loaded operating lever 34, 34b, whose short arm 34a forms a catch. The elements of the dog 32, 33, have co-acting cam tracks 35 which operate to couple and uncouple the clutch 30.

The clutch 30 is loaded in the known manner by a spring (not shown) tending to urge the elements apart and allow the pulley 27 to idle whereas when the lever 34 is moved in the direction of the arrow 36 the cam track 35 transmits sliding motion to the pulley 27 and couples the clutch 30; the rack 24 is then driven through the pinion 25. In the clutched position, the short arm 34a of the lever 34 is locked or latched with a detent 37 carried on a pivoted rod 39 fast with and controlled by a weighted lever 40. The latter lies in the path of an abutment 41 extending laterally from the rack 24 near its outer end in order that the rack abutment can trip the lever 40 in the direction of the arrow 42, release the detent 37 and thus disconnect the clutch 30 under power of the spring-loaded lever 34, 34b.

In Figs. 6 and 8, the clutch elements are shown in driving engagement and the abutment 41 on the driven rack 24 (Fig. 6) is approaching the position for tripping the lever 40. In Figs. 1 and 7 the clutch has been tripped into the uncoupled position.

Thus, when the clutch 30 is disengaged, the pinion shaft 26 can be rotated by the capstan handle 30a for moving the rack 24 away from the tools 16, 17, into its initial position when the plate 23 is at rest and backing up stock blocks 21 in the holder 20.

Thus it will be appreciated that the above described mechanism enables wood blocks 21 to be moved automatically under control at a slow rate towards the fast moving tools 16, 17.

Under the rotary motion of the chain, simple, but speedy, cutting operations take place at each stretch 10 of chain; firstly, the face of the wood is split by the tool 16 and as many grooves are cut or formed in the wood 21 as there are cutting edges 18 on the tool; the splitting effect is shown diagrammatically on a larger scale by Fig. 9 and each ridge 43 is a potential strand and there may be sixty or more grooves cut simultaneously, this depending upon the size of the machine. The tool 17 following the splitting tool 16 proceeds to shave the routed face as indicated at Fig. 5, the multiple shavings or strands being indicated at 44. It will be understood that splitting and shaving is carried on in that order successively and repeatedly at a high speed at two positions of the machine and thus a high output of wood wool is made possible. The strands fall into the area between the feet 1a of the machine frame and can be readily collected.

The machine is semi-automatic in the sense that the high speed splitting and shaving operations continue until the stock is safely exhausted when the feed of stock is discontinued by the automatic disconnection of the clutch 30.

The output of wood strands can be calculated with reference to weight as the product of the number of teeth on each cutter, the number of pairs of splitting and shaving blades and the number of cycles per time period of the endless transmission mechanism, and by arranging for the automatic feeding of stock to the parallel stretches of the mechanism it is possible with fourteen or sixteen pairs of splitting and shaving cutters to attain an output of six tons of wood wool per eight-hour working day; the dimensions of each strand may be in the region of $\frac{3}{16}''$ wide by $1/64''$ or $1/32''$, the length of strand varying according to the section of stock.

If, for example, there are fourteen pairs of tools and each splitting tool can split wood thus to form sixty ridges in a face of the wood, it is possible while splitting and shaving simultaneously at both stretches 10 of the chain to produce $60 \times 14 \times 2 = 1,680$ strands per cycle of the machine and with a cutting speed of 500 ft. per minute at each stretch of chain a very fast production is possible.

It will be appreciated that on power transmission to the bevel gearing 7, the chains 2, their articulated tool holders 11 with the succession of pairs of splitting and shaving tools 16, 17, are driven in unison at high speed. The parallel stretches of chain 10 are maintained by the rollers 14, in rolling contact with the abutment bars 13, in the parallel positions the opposite the stock holders 20 charged with wood 21 and under power feed.

What I claim is:

A machine for making wood wool from solid stock comprising in combination a machine frame mounted on a base, an endless driving mechanism mounted on drive sprockets turnable about vertical axes on said frame, said driving mechanism consisting of a pair of superposed chains lying in spaced horizontal planes and providing parallel chain stretches intermediate the sprockets, horizontal abutments on said frame between said sprockets and rollers on said chains co-acting with said abutments and supporting said chain along said stretches, tool holders interconnected to and extending between said pair of chains, each tool holder consisting of a frame interconnected to said chains and a tool carrier adjustably connected to said frame, said adjustable connection comprising threaded bushes engaging nuts in said frame, said bushes being axially adjustable in said nuts and having a part of said nuts co-acting with said tool carrier, screw clamping devices engaging said tool carrier and said bushes for fastening said tool carrier to said frame, the said axial adjustment of said bushes serving to effect a lateral adjustment of said tool carrier relative to said frame in order that the tool carrier can be correctly positioned with respect to said stock, tools carried by said tool carriers and comprising alternate splitting and shaving tools, each splitting tool consisting of an externally grooved cylinder formed with multiple peripheral cutting edges, said splitting tool being turnable axially in its tool carrier without detachment from said tool carrier for bringing fresh multiple cutting edges into operative positions, a stock holder carried by said frame and located at right angles to a chain stretch, a plate in said stock holder and a feed mechanism for transmitting linear motion to said feed plate for advancing said feed plate towards a chain stretch and a driving connection between said feed mechanism and the machine.

WALTER EDWARD SHOTTON.

REFERENCES CITED

The following references are of record in the file of this patent:

UNITED STATES PATENTS

| Number | Name | Date |
|---|---|---|
| 234,475 | Howes | Nov. 16, 1880 |
| 1,207,055 | Keogh | Dec. 5, 1916 |
| 1,761,121 | Graves | June 3, 1930 |
| 2,080,557 | Bravi | May 18, 1937 |
| 2,240,506 | Levesque | May 6, 1941 |

FOREIGN PATENTS

| Number | Country | Date |
|---|---|---|
| 556,825 | Germany | 1932 |